US009311945B2

(12) United States Patent
Takahashi et al.

(10) Patent No.: US 9,311,945 B2
(45) Date of Patent: Apr. 12, 2016

(54) MAGNETIC HEAD FOR MICROWAVE ASSISTED MAGNETIC RECORDING

(71) Applicant: HGST Netherlands B.V., Amsterdam (NL)

(72) Inventors: Kenichiro Takahashi, Fujisawa (JP); Junguo Xu, Kasumigaura (JP); Jianhua Li, Kanagawa (JP); Masaru Furukawa, Kanagawa (JP)

(73) Assignee: HGST NETHERLANDS B.V., Amsterdam (NL)

( * ) Notice: Subject to any disclaimer, the term of this patent is extended or adjusted under 35 U.S.C. 154(b) by 71 days.

(21) Appl. No.: 14/073,751

(22) Filed: Nov. 6, 2013

(65) Prior Publication Data

US 2015/0124353 A1 May 7, 2015

(51) Int. Cl.
*G11B 5/00* (2006.01)
*G11B 5/60* (2006.01)

(52) U.S. Cl.
CPC ...... *G11B 5/6076* (2013.01); *G11B 2005/0024* (2013.01)

(58) Field of Classification Search
CPC ............... G11B 5/6076; G11B 5/3133; G11B 2005/0024
USPC .......................................................... 360/128
See application file for complete search history.

(56) References Cited

U.S. PATENT DOCUMENTS

| | | | | |
|---|---|---|---|---|
| 8,085,490 | B2 | 12/2011 | Franca-Neto et al. | |
| 8,300,346 | B2 | 10/2012 | Ikeda et al. | |
| 8,325,442 | B2 | 12/2012 | Koui et al. | |
| 8,351,155 | B2 | 1/2013 | Contreras et al. | |
| 2009/0059418 | A1 | 3/2009 | Takeo et al. | |
| 2010/0142088 | A1* | 6/2010 | Iwasaki et al. | 360/110 |
| 2011/0038080 | A1 | 2/2011 | Alex et al. | |
| 2011/0149428 | A1* | 6/2011 | Franca-Neto et al. | 360/75 |
| 2011/0205667 | A1 | 8/2011 | Yamada et al. | |
| 2012/0069465 | A1 | 3/2012 | Sato et al. | |
| 2012/0099218 | A1 | 4/2012 | Kurita et al. | |
| 2012/0262816 | A1* | 10/2012 | Tanaka et al. | 360/59 |

OTHER PUBLICATIONS

The ip.com Prior Art Database; "Touch down Threshold of ECS (Embedded Contact Sensor )"; Mar. 2012; 1 page.

* cited by examiner

*Primary Examiner* — Gustavo Polo
(74) *Attorney, Agent, or Firm* — Patterson & Sheridan, LLP

(57) ABSTRACT

Embodiments of the present invention generally relate to a MAMR head. The MAMR head includes an STO and an embedded contact sensor (ECS). The STO and the ECS are electrically connected in series and are connected to the same terminals. During operation, the current applied to the STO is controlled with respect to a change in resistance of the ECS.

10 Claims, 4 Drawing Sheets

STO DAMAGE RATIO %
0 1 2 3 4 5 6 7
0 50 100 150 200
DELTA VOLTAGE BETWEEN STO AND DISK POTENTIAL mV

MAGNETIC HEAD FOR MICROWAVE ASSISTED MAGNETIC RECORDING

BACKGROUND

1. Field

Embodiments of the present invention generally relate to a magnetic disk device employing a magnetic head having a spin torque oscillator (STO).

2. Description of the Related Art

Over the past few years, microwave assisted magnetic recording (MAMR) has been studied as a recording method to improve the areal density of a magnetic read/write device, such as a hard disk drive (HDD). MAMR enabled magnetic recording head utilizes an STO for generating a microwave (high frequency AC magnetic field). When the magnetic field from the write head is applied and current is conducted to the STO, the STO oscillates and may provide an AC magnetic field to the medium. The AC magnetic field may reduce the coercive force of the recording medium, thus high quality recording by MAMR may be achieved.

As the gap between the recording head and the recording medium gets smaller, the likelihood of physical contact between the STO and the recording medium is increased. If the STO and the recording medium come into contact while current is being applied to the STO, there is a high probability of discharge breakdown of the STO. Therefore, there is a need in the art for an improved recording head for MAMR.

SUMMARY OF THE INVENTION

Embodiments of the present invention generally relate to a MAMR head. The MAMR head includes an STO and an embedded contact sensor (ECS). The STO and the ECS are electrically connected in series and are connected to the same terminals. During operation, the current applied to the STO is controlled with respect to a change in resistance of the ECS.

In one embodiment, a MAMR head is disclosed. The MAMR head includes an STO and a contact sensor. The STO and the contact sensor are connected in series to a first and a second terminal.

In another embodiment, a MAMR head is disclosed. The MAMR head includes an STO and a contact sensor electrically coupled to the STO. The distance between the STO and the contact sensor is greater than a result a formula: $10^{-7}*(R/60)*(2*\pi*r)$. R is a disk rotational speed in rotations per minute and r is a levitated radial position of a slider with respect to a disk in millimeters.

In another embodiment, a MAMR head is disclosed. The MAMR head includes an STO having a first width and a contact sensor electrically coupled to the STO. The contact sensor has a second width that is greater than the first width, and the second width is greater than a result of a formula: W1+Tan A1*D+Tan A2*D, where W1 is the first width, A1 and A2 are skew angles with respect to the spin torque oscillator and the contact sensor and D is a distance between the spin torque oscillator and the contact sensor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to a MAMR head. The MAMR head includes an STO and an embedded contact sensor (ECS). The STO and the ECS are electrically connected in series and are connected to the same terminals. During operation, the current applied to the STO is controlled with respect to a change in resistance of the ECS.

Figure 1:
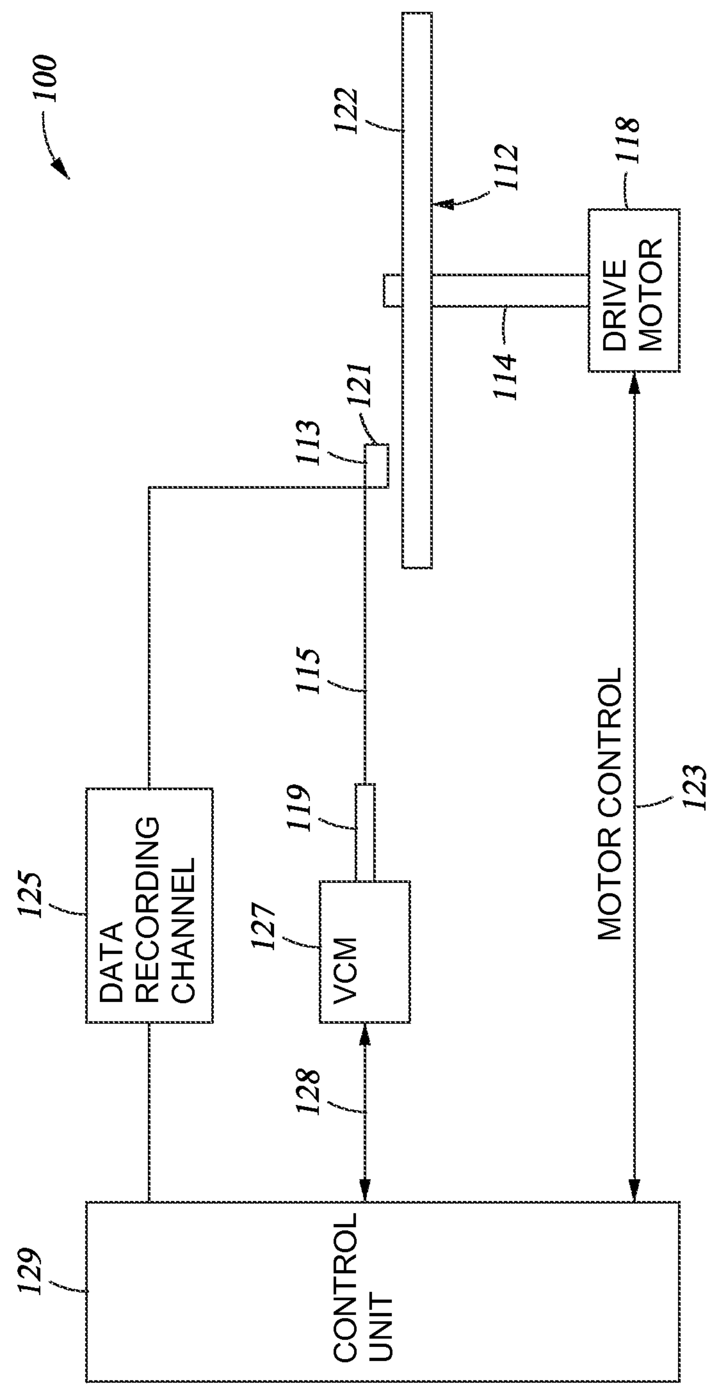
FIG. 1 illustrates a disk drive system, according to embodiments described herein.

FIG. 1 illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a STO for applying an AC magnetic field to the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of the MAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
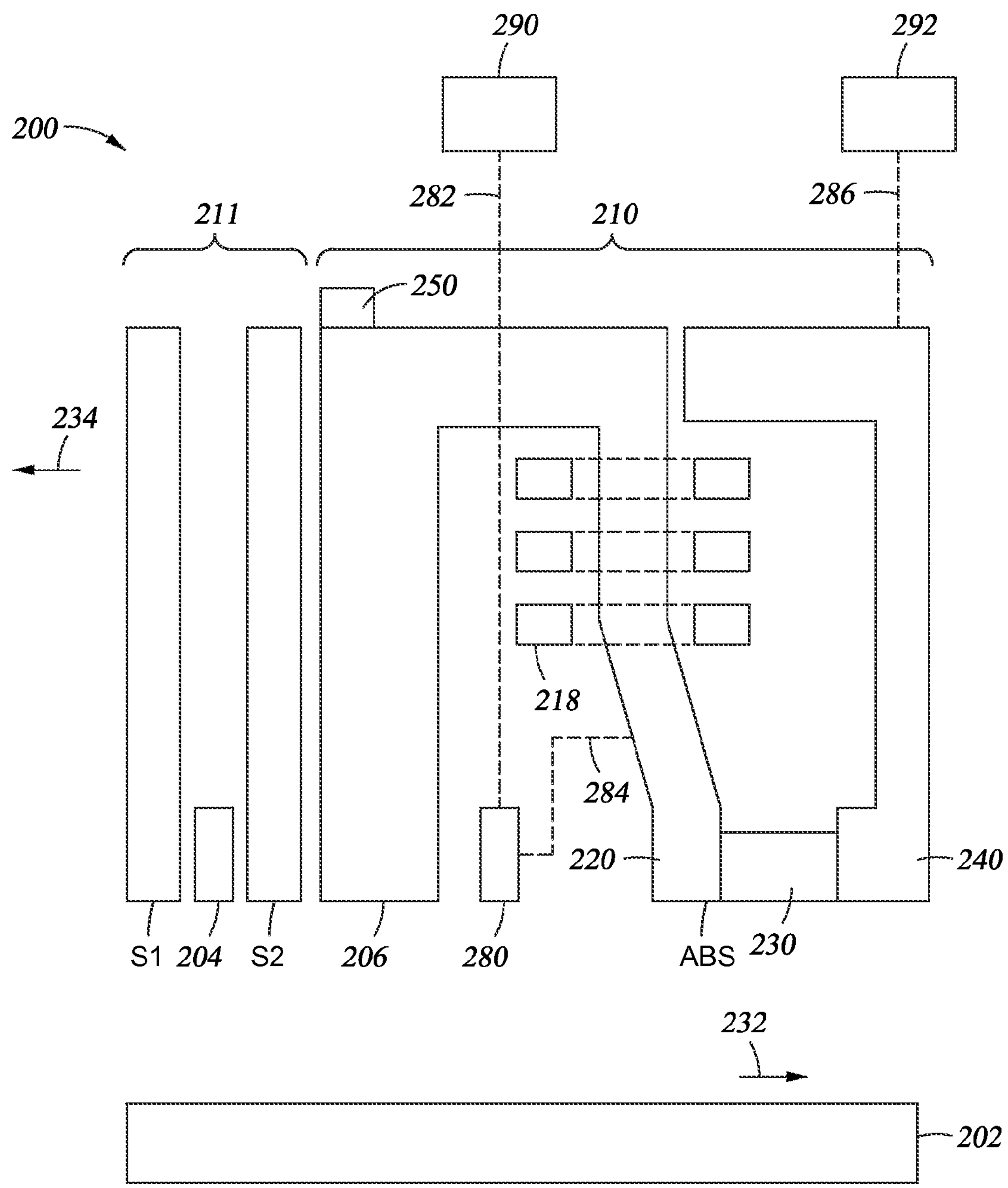
FIG. 2 is a cross sectional view of a MAMR read/write head and magnetic disk of the disk drive system of FIG. 1, according to one embodiment of the invention.

FIG. 2 is a fragmented, cross sectional side view through the center of a MAMR read/write head 200 facing magnetic disk 202. The read/write head 200 and magnetic disk 202 may correspond to the magnetic head assembly 121 and magnetic disk 112, respectively in FIG. 1. The read/write head 200 includes an ABS, a magnetic write head 210 and a magnetic read head 211, and is mounted such that the ABS is facing the magnetic disk 202. In FIG. 2, the disk 202 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 202 are detectable by the MR (or MTJ) sensing element 204 as the recorded bits.

The write head 210 includes a return pole 206, a STO 230 disposed between a main pole 220 and a trailing shield 240, and a coil 218 that excites the main pole 220. A recording magnetic field is generated from the main pole 220 and the trailing shield 240 helps making the magnetic field gradient of the main pole 220 steep. The main pole 220 may be a magnetic material such as a CoFe alloy. In one embodiment, the main pole 220 has a saturated magnetization (Ms) of 2.4 T and a thickness of about 300 nanometers (nm). The trailing shield 240 may be a magnetic material such as NiFe alloy. In one embodiment, the trailing shield 240 has an Ms of about 1.2 T.

The main pole 220, the trailing shield 240 and the STO 230 all extend to the ABS, and the STO 230 disposed between the main pole 220 and the trailing shield 240 is electrically coupled to the main pole 220 and the trailing shield 240. The STO 230 may be surrounded by an insulating material (not shown) in a cross-track direction (into and out of the paper). During operation, the STO 230 generates an AC magnetic field that travels to the magnetic disk 202 to lower the coercivity of the region of the magnetic disk 202 adjacent to the STO 230. The write head 210 further includes a heater 250 for adjusting the distance between the read/write head 200 and the magnetic disk 202. The location of the heater 250 is not limited to above the return pole 206, as shown in FIG. 2. The heater 250 may be disposed at any suitable location.

Conventional MAMR head does not have an ECS for detecting a contact between the head and the disk. The STO of a conventional MAMR head may be connected to two terminals: one via the main pole and the other via the trailing shield. If a contact has occurred, the STO may experience a discharge breakdown since current is applied to the STO during the contact. To avoid a discharge breakdown or reduce the probability of a discharge breakdown of the STO, an ECS may be incorporated in MAMR heads.

As shown in FIG. 2, the read/write head 200 also includes an ECS 280 disposed at a location that is leading to the STO 230 for detecting a contact between the head 200 and the disk 202. The ECS 280 may be disposed between the main pole 220 and the shield S2 and may be embedded in alumina (not shown). The ECS 280 may be a resistance temperature detector (RTD) where the electrical resistance of the material comprising the ECS 280 changes as the temperature of the material varies (either inversely or directly). The ECS 280 may be made of a material including Ta, Pt, Au, Rh, NiFe, or alloys thereof. The incorporation of the ECS 280 may not increase the number of terminals. The ECS 280 may be electrically connected to the same two terminals 290, 292 to which the STO 230 is electrically connected. Absent the ECS 280, the STO 230 would be electrically connected to terminals 290, 292 via the main pole 220 and the trailing shield 240, respectively. With the ECS 280 being present, the main pole 220 is not electrically connected to the terminal 290. The ECS 280 is electrically connected to the terminal 290 via wiring 282 and is also electrically connected to the main pole 220 via wiring 284. The STO 230 is electrically coupled to the main pole 220 and the trailing shield 240, and the trailing shield 240 is electrically connected to the terminal 292 via wiring 286. Thus, the ECS 280 is also electrically connected to the terminal 292 via the main pole 220, the STO 230 and the trailing shield 240. The STO 230 is also electrically connected to the terminal 290 via the main pole 220 and the ECS 280. Therefore, both the ECS 280 and the STO 230 are electrically connected to terminals 290 and 292, and the ECS 280 and the STO 230 are electrically connected in series. One benefit of this configuration is that the current flowing to the STO 230 is reduced as the resistance of the ECS 280 is increased due to frictional heating caused by a contact between the head 200 and the disk 202 (typically an asperity on the disk 202). The voltage applied to the STO 230 is also reduced. This is a passive method of controlling the current applied to the STO 230 by the resistance change of the ECS 280. In one embodiment, the resistance of the ECS 280 is more than twice the resistance of the STO 230 when there is not a contact. For example, the resistance of the STO 230 may be about 50 ohm and the resistance of the ECS 280 may be more than 100 ohm. When a contact occurs, the current flowing to the STO 230 is reduced by 40% because of the increase in resistance of the ECS 280.

Figure 3:
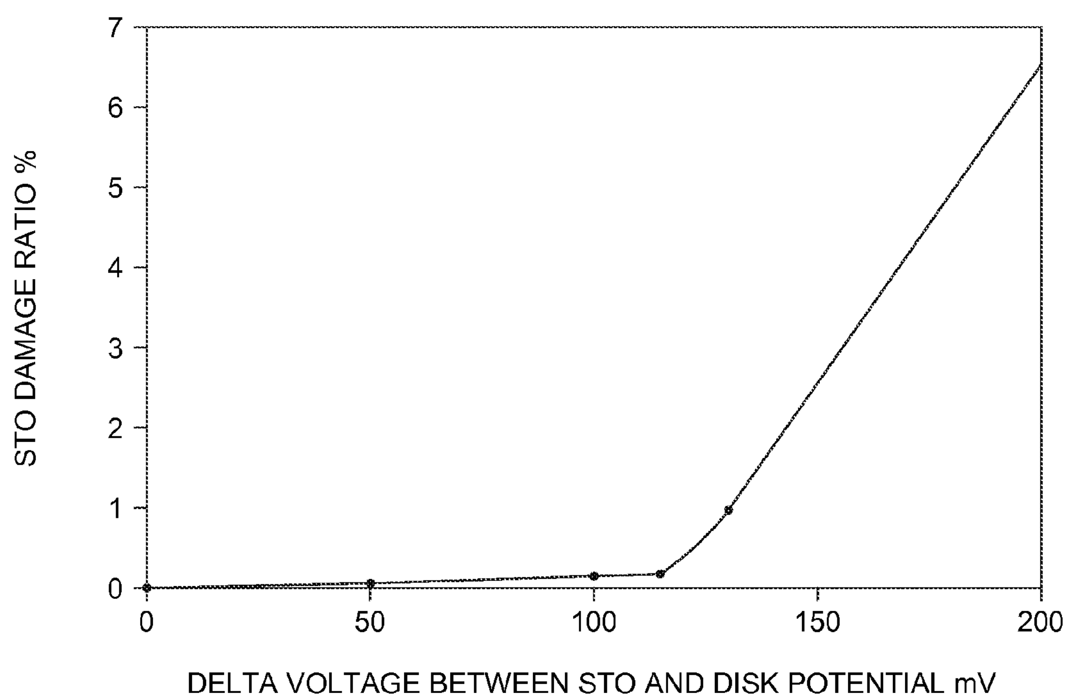
FIG. 3 is a chart showing a relationship between STO damage ratio and delta voltage between STO and disk potential, according to various embodiments of the invention.

It has been found that no damage occurs to the STO 230 when the voltage applied to the STO 230 is less than 120 mV, as shown in FIG. 3. FIG. 3 is a chart showing a relationship between STO damage ratio and delta voltage between STO and disk potential, according to various embodiments of the invention. As shown in FIG. 3, the STO 230 is not damaged when the voltage applied to the STO 230 is less than 120 mV. Thus, the resistance of the ECS 280 is adjusted so the voltage applied to the STO 230, when there is a contact between the head 200 and the disk 202, is less than 120 mV. The resistance of the ECS 280 may be adjusted by choosing a particular material to be the ECS 280 or adjusting the dimensions of the ECS 280. In one embodiment, the voltage applied to the STO is less than 200 mV when there is not a contact. When a contact occurs, the voltage applied to the STO 230 is reduced by 40% to less than 120 mV.

Figure 4:
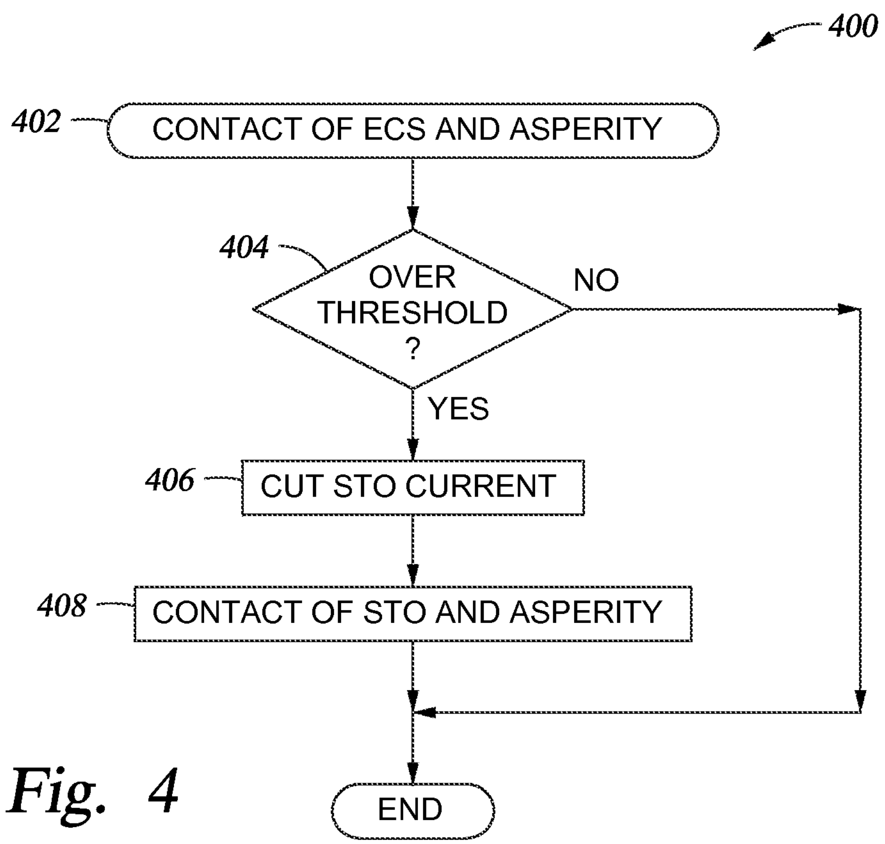
FIG. 4 is a flow chart showing a method of controlling a current applied to an STO according to one embodiment of the invention.

With the ECS 280 and the STO 230 electrically connected in series, the current applied to the STO 230 is controlled by measuring the change of resistance of the ECS 280. FIG. 4 is a flow chart showing a method 400 of controlling a current applied to the STO 230 according to one embodiment of the invention. The method 400 is an active method of controlling the current applied to the STO 230 by the resistance change of the ECS 280. The method 400 starts at block 402, when a contact between the ECS 280 and an asperity on the disk 202 causes an increase in the electrical resistance of the ECS 280 due to friction heating. At block 404, an evaluation is made as to whether the amount of the increase in the electrical resistance of the ECS 280 exceeds a threshold value or not. If the amount of the increase in electrical resistance of the ECS 280 exceeds the threshold value, the current applied to the STO 230 is stopped, as shown at block 406. Next, at block 408, the STO 230 contacts the asperity on the disk 202 without any current flowing to the STO 230. As a result, a discharge breakdown of the STO 230 is avoided since no currently is applied to the STO 230 during the contact. If the amount of the increase in electrical resistance of the ECS 280 does not exceed the threshold value, current is still applied to the STO 230.

In order for method 400 to be functional, block 406 should happen before block 408. The ECS 280 may achieve contact detection with a 10 MHz signal, requiring about 1 microsecond between block 402 and block 406. To make sure the current is stopped from flowing to the STO 230 before the STO 230 contacts the asperity, the ECS 280 is separated from the STO 230 by a sufficient distance and is disposed at a location that is leading to the STO 230 relative to movement of the disk 202. In other words, the ECS 280 is disposed at a location so the ECS 280 would contact an asperity on the disk 202 before the STO 230 contacts that asperity.

Figure 5:
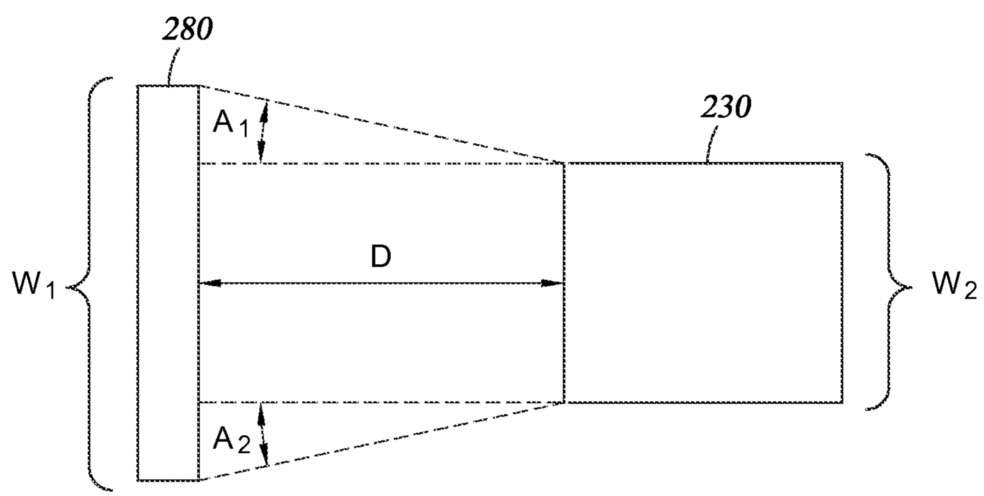
FIG. 5 is an ABS view of an ECS and the STO according to one embodiment of the invention.

FIG. 5 is an ABS view of the ECS 280 and the STO 230 according to one embodiment of the invention. The components between the ECS 280 and the STO 230 are omitted for clarity. The distance "D" between the ECS 280 and the STO 230 may be greater than the result of a formula: $10^{-7}*(R/60)*(2*\pi*r)$, where R is a disk rotational speed of the disk 202 in rotations per minute (rpm) and r is a levitated radial position of the slider 113 on the disk 202 in millimeters (mm). In one embodiment, R is 7200 rpm, r is 28 mm and D is greater than 0.0021 mm, or 2.1 micrometers. In addition, in order to detect all possible contacts with the STO 230, the width of the ECS 280, indicated in FIG. 5 as "W1", extends over at least the skew angles "A1" and "A2" with respect to the STO 230. In other words, the width W1 of the ECS 280 is greater than the width W2 plus the sum of Tan A1*D and Tan A2*D. The angle A1 and A2 may be the same. In one embodiment, D is 2.1 micrometers, W2 is 40 nm, the angles A1 and A2 are both 15 degrees and W1 is 1.2 micrometers.

In summary, a MAMR head having an ECS and an STO is disclosed. The ECS and the STO are electrically connected in series and are connected to the same two terminals. Thus, no additional terminals are required for the incorporation of the ECS. The ECS is disposed at a location so the ECS contacts an asperity on the disk before the STO contacts the same asperity. The ECS may be used to passively or actively control the current applied to the STO, so no current or a reduced current is applied to the STO when the STO contacts the asperity on the disk. As a result, discharge breakdown of the STO is avoided.

While the foregoing is directed to embodiments of the present invention, other and further embodiments of the invention may be devised without departing from the basic scope thereof, and the scope thereof is determined by the claims that follow.

What is claimed is:

1. A microwave assisted magnetic recording head, comprising:
- a spin torque oscillator; and
- a contact sensor electrically coupled to the spin torque oscillator, wherein a distance between the spin torque oscillator and the contact sensor is greater than a result of a formula: $10^{-7}*(R/60)*(2*\pi*r)$, wherein R is a disk rotational speed in rotations per minute and r is a levitated radial position of a slider with respect to a disk in millimeters.

2. The microwave assisted magnetic recording head of claim 1, further including a main pole and a trailing shield, wherein the spin torque oscillator is electrically coupled to the main pole and the trailing shield.

3. The microwave assisted magnetic recording head of claim 2, wherein the contact sensor is electrically connected to the main pole.

4. The microwave assisted magnetic recording head of claim 3, wherein the contact sensor is electrically connected to a first terminal.

5. The microwave assisted magnetic recording head of claim 4, wherein the trailing shield is electrically connected to a second terminal.

6. The microwave assisted magnetic recording head of claim 5, wherein the contact sensor is electrically connected to the second terminal via the main pole, the spin torque oscillator and the trailing shield.

7. The microwave assisted magnetic recording head of claim 6, wherein the contact sensor is disposed at a location that is leading to the spin torque oscillator relative to movement of a magnetic recording disk.

8. The microwave assisted magnetic recording head of claim 1, wherein the contact sensor includes a material selected from the group consisting of Ta, Pt, Au, Rh, NiFe, and alloys thereof.

9. The microwave assisted magnetic recording head of claim 1, wherein the contact sensor is disposed at a location that is leading to the spin torque oscillator relative to movement of a magnetic recording disk.

10. A microwave assisted magnetic recording head, comprising:
- a spin torque oscillator having a first width; and
- a contact sensor electrically coupled to the spin torque oscillator, wherein the contact sensor has a second width that is greater than the first width, and wherein the second width is greater than a result of a formula: W1+Tan A1*D+Tan A2*D, wherein W1 is the first width, A1 and A2 are skew angles with respect to the spin torque oscillator and the contact sensor and D is a distance between the spin torque oscillator and the contact sensor.

* * * * *